United States Patent [19]
Koslow

[11] 3,924,132
[45] Dec. 2, 1975

[54] ELEMENT ANALYZER UTILIZING NEUTRON ACTIVATION

[76] Inventor: Evan E. Koslow, 5 Town Crier Lane, Westport, Conn. 06880

[22] Filed: May 30, 1974

[21] Appl. No.: 474,395

[52] U.S. Cl. .................................. 250/361; 250/366
[51] Int. Cl.² ........................................... G01T 1/20
[58] Field of Search ..................... 250/336, 361–369

[56] References Cited
UNITED STATES PATENTS

| | | | |
|---|---|---|---|
| 2,954,473 | 9/1960 | Hoover et al. ................... | 250/362 X |
| 3,049,619 | 8/1962 | Genovese, Jr. ..................... | 250/362 |
| 3,786,256 | 1/1974 | Untermyer ..................... | 250/363 X |

*Primary Examiner*—Davis L. Willis

[57] ABSTRACT

Apparatus is provided utilizing neutron activation to nondestructively analyze the elemental composition within a sample comprising a specimen and a dielectric medium. The apparatus comprises a base having an opening defining a double elliptical cavity therein. The inner walls of the cavity are coated with a reflective surface to enhance the focusing properties of the cavity. Means are provided for transporting the sample into the cavity, wherein a neutron source is utilized to irradiate the sample causing the emission of particles. The particles travel through the medium and emit a pulse of light. Detector means are provided for detecting the pusles and for generating a signal in accordance therewith. The shape of the cavity ensures that neutrons from the source will pass through a boron hydrocarbon liquid present in the cavity prior to entrance into the detector means. The boron hydrocarbon absorbs these neutrons preventing the neutrons from activating the detectors giving rise to excessive background signal which reduces the accuracy of the analyses. The appropriate processing circuitry for counting and analyzing the signals generated by detecting means is also provided. The apparatus requires only relatively low neutron fluxes to operate and yield analytically sensitive and accurate results thereby eliminating the necessity for the use of a nuclear reactor in conjuction therewith.

38 Claims, 6 Drawing Figures

ELEMENT ANALYZER UTILIZING NEUTRON ACTIVATION

The present invention relates to apparatus for nondestructive qualitative and quantitative analysis of the elemental composition of a specimen and in particular to an apparatus which accomplishes such analysis by means of neutron activation without requiring high neutron fluxes.

Precise and sensitive nondestructive element analysis is often required in laboratory and industrial applications where trace impurities determination, quality control, pollution analysis, and general sample identification must be performed. Techniques which have been employed to accomplish this result include atomic absorption spectroscopy, neutron activation analysis, and recently more complex methods such as charged particle x-ray fluorescence. The invention disclosed herein relates to a novel element analyzer which utilizes neutron activation to perform the analysis.

The principles of neutron activation analysis are well known in the art and various processes and analytical techniques are presently being used which incorporate this method of analysis. The method herein proposed involves preparing a sample by placing the specimen to be analyzed in a dielectric medium, such as by forming a solution, suspension or mixture thereof. The sample is then irradiated with neutrons which cause emissions from the specimen which result from the capture of the incident neutrons. These emitted particles or gamma-photons are detected and counted.

A particle traveling in a medium at a speed faster than the speed of light in that medium will emit radiation in the form of a light pulse. This effect is known as the Cerenkov effect. The angle at which the radiation is emitted can be calculated and is dependent upon the velocity of the particle and the refractive index of the medium. Because the angle of emitted radiation is dependent upon the velocity of the particle and the refractive index of the medium, for each medium there is some particular velocity above which the particle will emit light. Thus, a given amount of energy is required to cause the emission of light. For instance, if water is used as a medium, the threshold energy required for an electron to cause the emission of light is 0.261 Mev while for heavier charged particles the energy required is higher. Only charged particles can yield this radiation due to the nature of the event.

In order to insure that the medium selected in preparation of the sample will not emit particles during irradiation which produce light pulses and thus interfere with the counting of light pulses arising from particles emitted by the specimen, the medium is selected whereby particles emitted therefrom during neutron bombardment have less than the threshold energy for that medium and thus no light pulses are produced thereby.

It should be noted that the emission intensity is directly related to the angle at which the radiation is emitted which in turn is directly related to the particle velocity. Thus, a given particle traveling through a given medium will emit a known amount of radiation per unit length of the path thereof. This relationship allows for a certain amount of energy resolution. However, in the case of certain particles, for instance beta particles, the particles are not emitted with a monoenergetic velocity due to the sharing of the emission energy with a neutrino. Therefore, beta particles have an energy spectrum rather than an actual emission energy. This complicates energy resolution of the beta particles since there is always an overlap of particle energy spectra for any two specie.

Prior art analysis techniques require complex, expensive and time consuming nuclear counting techniques. These techniques can usually be used only on a sample-by-sample basis thereby eliminating any possibility of achieving an automatic sample handling and counting system. This is a disadvantage in many industrial and laboratory situations wherein simple and inexpensive testing methods are required. For example in water pollution testing, the specimen (pollutants) are already dissolved in an appropriate medium (water) to form a sample and if this sample could be analyzed by a simple analytical technique savings in time and cost would result.

The use of an element separation system in conjunction with this analyzer enhances the accuracy of the analysis and provides an opportunity for automating an element separation and analysis combination. Further, the utilization of an element separation system simplifies the pulse-height spectrum and counting procedure and enhances the accuracy of the element assay. However, in order to obtain full advantage from such combined separation and analysis systems, samples requiring minimum preparation are essential.

Many prior art analysis sytems are insensitive to the existence of certain activated specie. Specifically, activated specie which have extremely short half lives are often undetectable with prior art devices because these devices are not capable of simultaneous activation and particle counting and require substantial switchover time between activation and detection. Simultaneous activation and counting makes possible the analysis of specie not previously analyzable due to their extremely short half lives and therefore is extremely desirable.

For certain nuclear work it is necessary to assay different ratios of the isotopes of the same element. Thus it is desirable for an analyzer to be isotope specific as well as element specific. Prior art systems often are incapable of such sensitivity.

Most importantly, however, prior art analyzers using neutron activation normally require relatively high neutron fluxes in order to obtain desired sensitivity and suitably accurate results. In order to achieve such a high neutron flux, nuclear reactors are normally required. Thus, such analysis can normally be performed only at nuclear reactor sites. This is a great disadvantage because from cost, size and manpower viewpoints such analysis is normally prohibited, thereby substantially limiting use thereof in most laboratory and industrial applications.

It is, therefore, a prime object of the present invention to provide an element analyzer using neutron activation which operates and yields an analytically sensitive and accurate result at lower neutron fluxes and thus does not require the very high fluxes usually available only at nuclear reactor sites.

It is a second object of the present invention to provide an element analyzer using neutron activation which is of suitable size, ease of operation, and cost for use in a wide variety of laboratory and industrial applications which heretofore could not support such a system.

It is a third object of the present invention to provide an element analyzer using neutron activation which is not only element specific but can be isotope specific and thus can assay different ratios of the isotopes of the same element.

It is a fourth object of the present invention to provide an element analyzer using neutron activation which requires only simple, quick and inexpensive sample preparation and therefore is readily adaptable for automated sample handling and counting.

It is a fifth object of the present invention to provide an element analyzer using neutron activation which may be used in conjunction with an element separation system.

It is a sixth object of the present invention to provide an element analyzer using neutron activation which may analyze a large number of samples in an efficient manner while permitting the recovery of the sample.

It is a seventh object of the present invention to provide an element analyzer using neutron activation which is sensitive to short half life specie.

It is a eighth object of the present invention to provide an element analyzer using neutron activation which does not necessarily depend upon energy resolution to achieve an analytical result.

It is another object of the present invention to provide an element analyzer using neutron activation which utilizes a double elliptical cavity to focus emitted light pulses into the detector means.

It is a further object of the present invention to provide an element analyzer using neutron activation wherein the surface of the cavity is coated with an appropriate reflecting medium such that optimum focusing of said light pulses upon the detector means is possible.

It is still another object of the present invention to provide an element analyzer using neutron activation wherein the cavity is filled with a boron hydrocarbon liquid which prevents neutrons from interacting with the detector means, thus removing interferences arising from activated-product formation in the detector means and resulting in an enhanced accuracy for the analyzer.

It is still a further object of the present invention to provide an element analyzer using neutron activation which utilizes a pair of photomultiplier tubes connected by a coincidence circuit such that excessive background noise is reduced while signal pulses are not effected.

In accordance with the present invention an element analyzer is provided for nondestructive analysis of a sample comprised of a specimen and a dielectric medium. The analyzer includes a base having an opening defining a cavity therein and means for placing the sample in the cavity. A neutron source is positioned to irradiate the sample. Upon the formation of activated specie, high energy particles are emitted. Detector means are provided for detecting the presence of light pulses generated by these particles as these particles travel through the medium and for generating a signal in accordance with each occurrence thereof. Means operably connected to the detector means for counting and processing the signals are also provided.

The cavity is formed to have a double elliptical shape and the inner wall thereof is coated with a light reflective material. The shape of the cavity and the reflective inner surface thereof serve to focus the light emitted from the particles on the detector means to insure that each emission is detected. The detector means preferably comprises a pair of photomultiplier tubes which are connected to a coincidence circuit such that each particle occurrence is detected only once. This detection means also serves to substantially reduce the number of false counts due to background. Further, a boron hydrocarbon fluid is present in the cavity to prevent the neutrons from interacting with the detector means. These features substantially enhance the accuracy of the device. The coincidence circuit may be connected to the appropriate processing equipment such that counting or analysis of the detected particle emissions may be achieved.

The major advantage of the present invention is that only relatively low neutron fluxes are required to achieve the desired sensitivity. Nuclear reactors are not required as suitable levels of fluxes can be achieved by small neutron sources. As a result, the apparatus need not be located at a nuclear reactor site. Further, the cost and size thereof is such that it can be used in many laboratory and industrial applications.

The system of the present invention allows for a great deal of variation in the method of neutron activation and subsequent counting. If a high gamma background neutron source is utilized, this source can be placed in proximity to the sample for a preset irradiation period and then withdrawn. A count of the activated product decay can then be conducted. If a low gamma background neutron source is utilized, simultaneous irradiation and counting can be achieved. This allows for counting of activated products of extremely short half life.

The neutron source can be placed in direct proximity to the sample or an intermediate mass of hydrocarbon plastic can be used between the source and sample to thermalize the neutrons. Neutrons emitted from most sources have a characteristic neutron energy spectra. By placing an intermediate thermalizer between the sample and source, the neutron energy spectrum is shifted toward the lower energies (known as thermalization), thereby producing neutron interactions wherein certain emitted particles predominate. However, knowledge of the exact neutron spectrum is not as important as the reproducibility of the spectrum during each individual assay. Of course, when the specimen to be analyzed contains only a single element, analysis can be performed relatively easily by simply counting the light pulses. Since the strength of the source and the irradiation and counting times are known, quantitative analysis can be performed. However, when the specimen contains two or more elements, counting techniques become more complex. One way of reducing the complexity of the counting techniques while increasing the efficiency and accuracy of the element analyzer of the present invention is to use the analyzer in conjunction with an element separation system, as described in detail below.

There are, however, several other ways to differentiate between elements utilizing the present invention without use of prior element separation. One way is to utilize the difference between the half lives of the different activated species of different elements. This technique would involve the counting of the sample twice. The first count would take place immediately after activation when the shorter half life specie decay is dominant. Later, a second count is taken after a substantial portion of the shorter half life specie has decayed. A second method of differentiating between elements can be used if the activated specie of different elements have widely different energy emissions and thus yield two different pulse height peaks. A third way is to irradiate the sample twice, once with high energy neutrons and a second time with low energy neutrons. This is used in cases where one element interacts strongly with high energy neutrons while the second does not. The first element is thus ascertained, and an estimate of its contribution during low energy irradiation is made. The sample is then irradiated with low energy neutrons and the expected pulse count contribution of the known element is subtracted from the total count to yield the contribution from the second element. Thus, there are a number of techniques using the present invention which can be used to assay complex mixtures of elements within a sample.

Another advantage of the present invention is versatility. The Cerenkov effect is not the only one of the possible light emitting mechanisms which might be used in this apparatus. It is also possible to utilize the device as a scintillation counter if a solution having light emitting properties based on the scintillation effect were substituted for the dielectric medium. This change, however, might require certain refinements in the embodiment described therein, such as shutters to block the detector means during irradiation of the sample.

To the accomplishment of the above and to such other objects as may hereinafter appear, the present invention relates to apparatus for analyzing a spepcimen using neutron activation as defined in the appended claims and as described in the specification taken together with the accompanying drawings wherein like numerals refer to like parts and in which:

Figure 1:
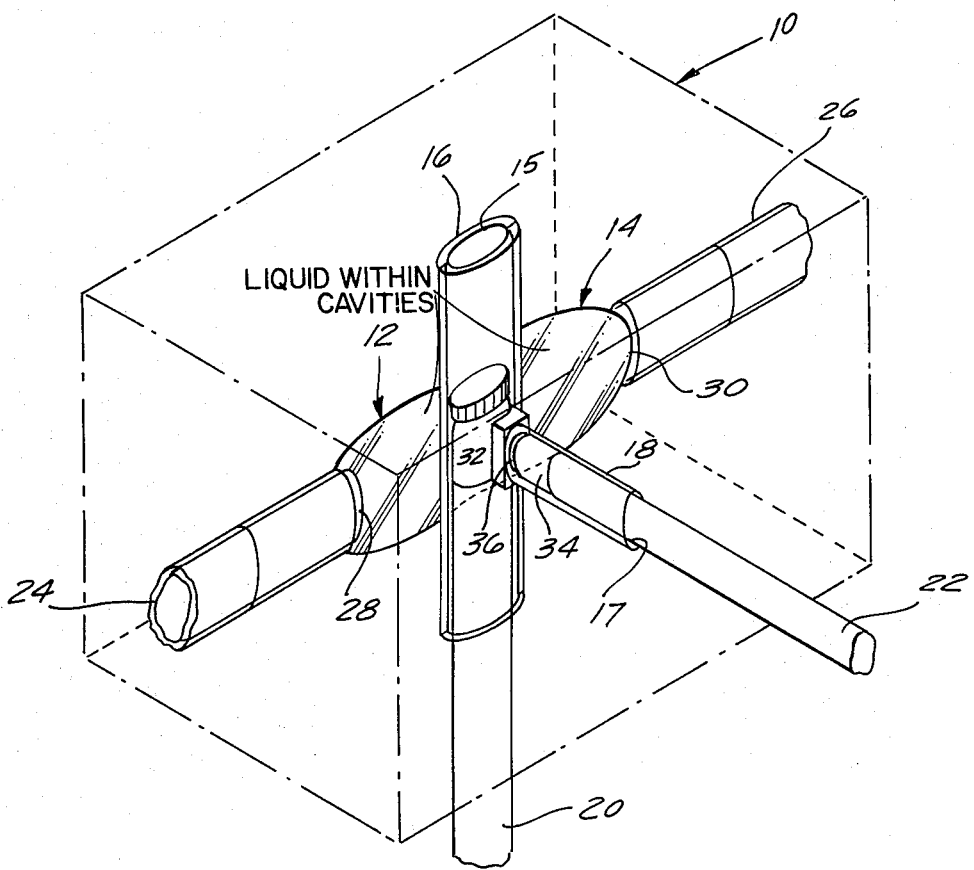
FIG. 1 is an isometric view of a first preferred embodiment of the present invention.
Figure 2:
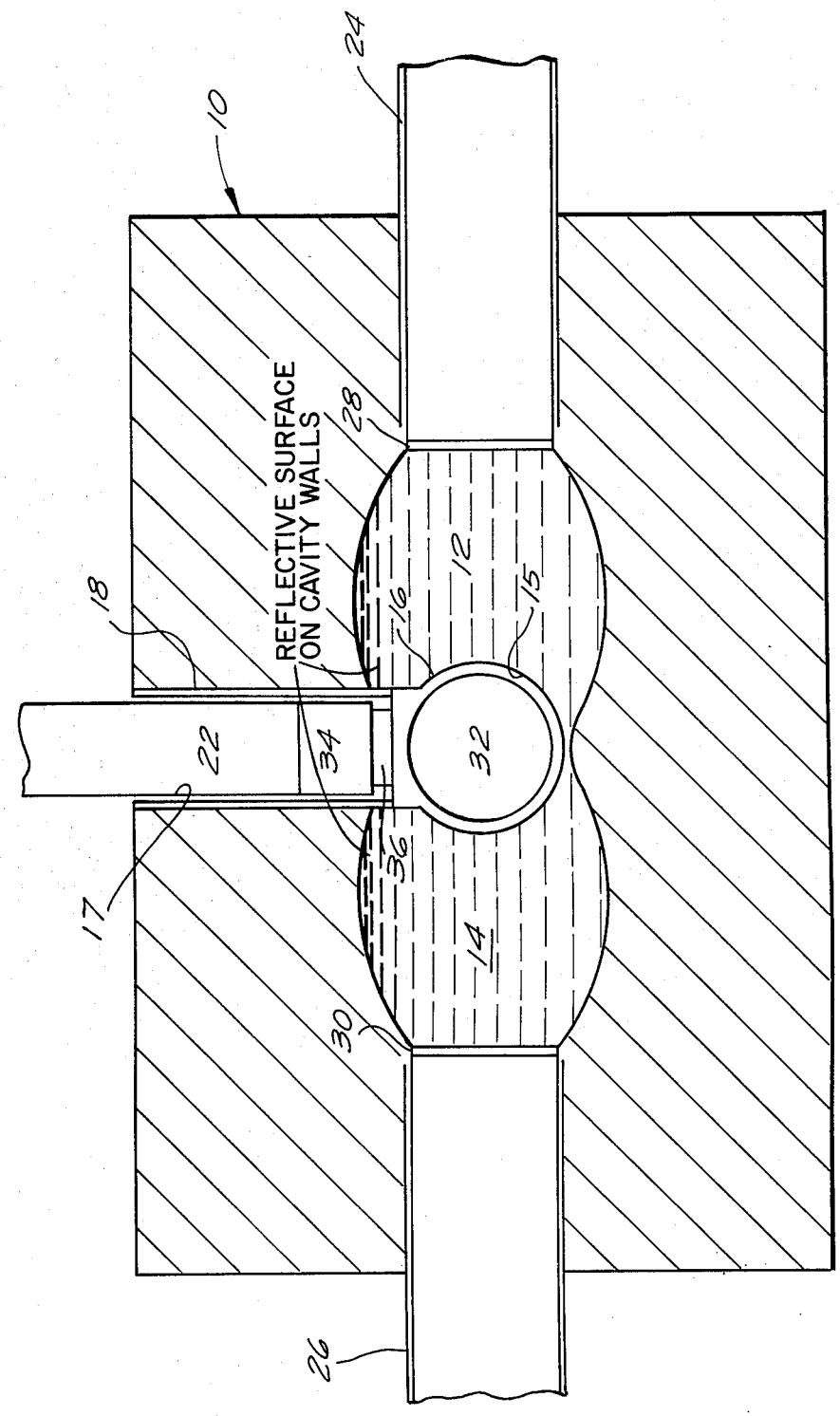
FIG. 2 is a top view of the embodiment shown in FIG. 1.

As seen in FIGS. 1 and 2, the analyzer of the present invention comprises a base, generally designated 10, preferably made of plastic. While many different plastics may be utilized for this purpose, Lucite or polyethylene have been found to be particularly well suited because of their easy casting and handling characteristics. Within base 10 is formed a cavity or chamber which has two elliptically shaped sections, generally designated 12 and 14 respectively. The plastic which surrounds the sections 12 and 14 is preferably coated with a reflective material by either plastic electroplating or vacuum depositing a metal surface, or attaching thin metal foils thereon. The reflective inner surface of the cavity should have a relatively small neutron capture cross-section and thus have a negligible contribution toward the background. the material selected should not emit particles yielding a pulse of light, or if it does such emission should have a very long half-life. Further, since a boron hydrocarbon will be present in the cavity, the metal used in the reflective surface should not be adversely affected thereby. Such metals as beryllium and aluminum or the oxides thereof have proven effective for coatings in this regard.

A vertical bore 15 is provided passing through base 10 and the junction area of sections 12 and 14. Into this bore the elevator guide tube 16 is attached. A second bore 17 is provided perpendicular to the elevator guide tube into which a neutron source guide tube 18 is placed. An elevator shaft 20 is provided within elevator guide tube 16 for positioning the sample 32 within the cavity. A piston 22 is provided within neutron source guide tube 18 for positioning the neutron source 36 adjacent the sample for irradiation thereof.

Bores 24 and 26 are provided extending from the exterior end of sections 12 and 14 respectively. Between bore 24 and section 12 a clear plastic end window 28 is provided. In a similar fashion, between section 14 and bore 26 a clear plastic end window 30 is provided. The cavity is thus made liquid tight. Bores 24 and 26 will each house one of the photomultiplier tubes (not shown) which comprise the detector means. A boron hydrocarbon liquid is then injected into the cavity and the injection port (not shown) is subsequently sealed. The purpose of the boron compound is to absorb excess neutrons, thus preventing false activation of the photon detectors by neutrons from the source and to reduce background from the extraneous activation of surrounding materials. This compound thermalizes neutrons effectively because of its high hydrogen content and does not yield emission particles above the threshold energy upon activation. In particular, triethylboron has proven satisfactory in this regard although other compounds may also function well. The use of such a fluid substantially enhances the accuracy of the device. Boron hydrocarbons are synthesized most commonly by the hydroboration of alkenes using borane gas. The analyzer's effectiveness can be increased, background reduced, and size of the analyzer diminished by use of boron enriched in the $B^{10}$ isotope.

The analyzer is then placed within an appropriate cosmic ray shielding and the photomultiplier tubes are optically coupled to windows 28 and 30 respectively using an optical coupling fluid. The neutron source controls and elevator are then attached.

The sample is prepared from the specimen to be analyzed and the appropriate dielectric medium and placed in a vial 32. The medium may be any clear dielectric medium; solid, liquid or gas which, upon activation, does not emit particles above its threshold energy. For example, water is often used. The specimen may be combined with the medium to form a mixture or a suspension but most commonly a solution is formed. (If the apparatus is to be used as a scintillation counter then the suitable liquid scintillation solution may be used as a medium.) The vial 32 is positioned within the cavity through elevator guide tubes 16 by means of elevator shaft 20. A neutron reflector 34 is connected to the end of piston 22. The neutron source 36 is affixed to the end of the neutron reflector 34 such that piston 22 may be moved along tube 18 until it is in close proximity to the sample in vial 32. A variety of neutron sources 36 may be utilized depending upon the particular application for which the analyzer is used.

Preferably, such sources are enclosed in capsules of stainless steel.

Each of the sections 12, 14 has an elliptical shape such that the neutrons from the source 36 must pass through the boron hydrocarbon liquid before reaching the multiplier tubes. Thus, chance activation of the photomultiplier tubes by the neutrons is prevented. Because of the shape of the cavity, each emission is reflected only a single time before it enters the detector means thus maximizing the light collection and by this, counting efficiency, for these light pulses.

Figure 3:
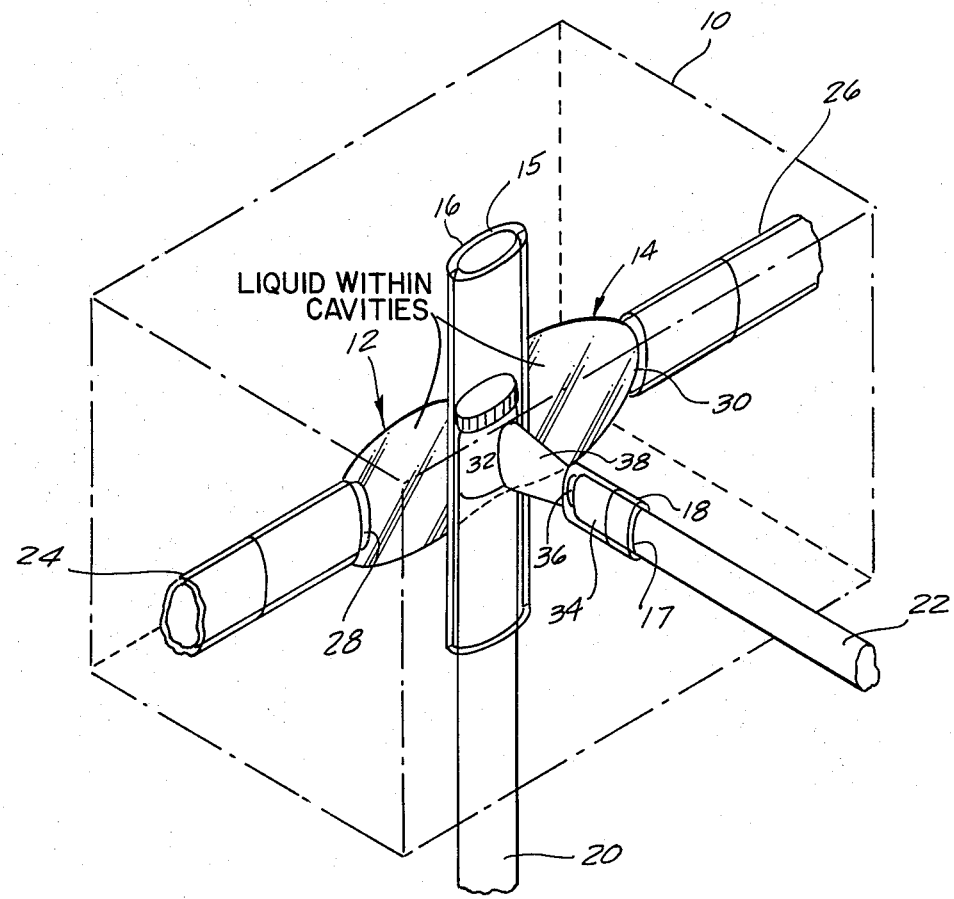
FIG. 3 is an isometric view of a second embodiment of the present invention.
Figure 4:
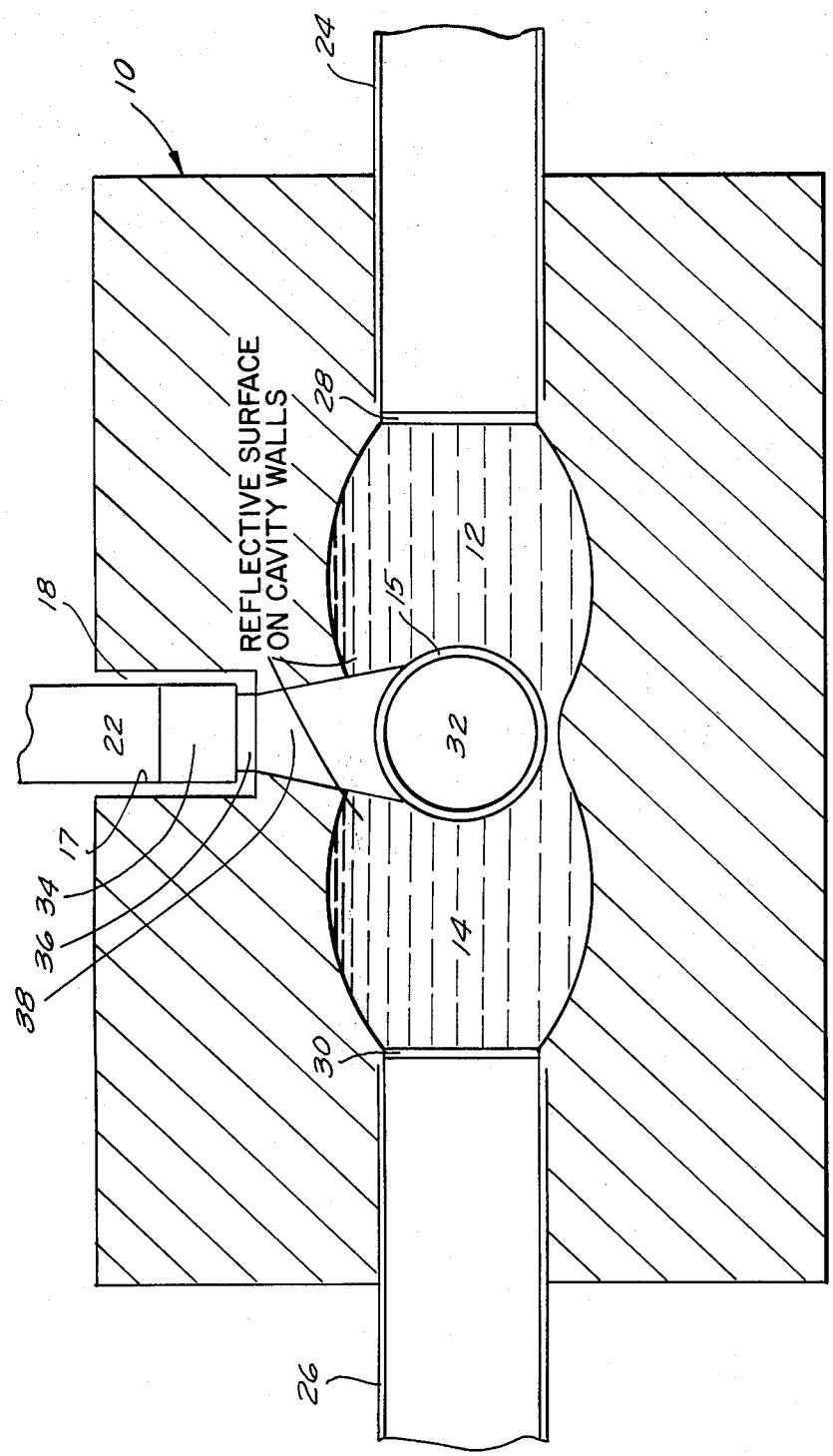
FIG. 4 is a top cutaway view of the embodiment of the present invention shown in FIG. 3.

The embodiment shown in FIGS. 3 and 4 is essentially of the same construction as described above. However, in this embodiment a neutron thermalizer 38, in the form of a clear block of hydrocarbon plastic is utilized between source 36 and tube 16. Although many different plastics may be used in this regard, polyethylene has proven particularly well suited. For maximum efficiency, thermalizer 38 is produced without known boron or other impurities. Placing an intermediate thermalizer between the sample and source shifts the neutron energy spectrum towards lower energies and thus changes the type of neutron interaction predominating. This increases the sensitivity of element assays due to increased neutron capture cross-sections at lower neutron energies.

Although the particular form or design of the electronic components utilized in conjunction with the present invention form no part thereof, for purposes of completeness a simple processing system which might be utilized with the present invention will be described in conjunction with FIG. 5. The electrical components shown herein are commercially available and thus shown only in block form. It should be understood, however, that the particular processing system shown in FIG. 5 is described for purposes of illustration only and various components may be substituted or changed depending upon the particular type of analysis the present invention is being utilized to perform.

Figure 5:
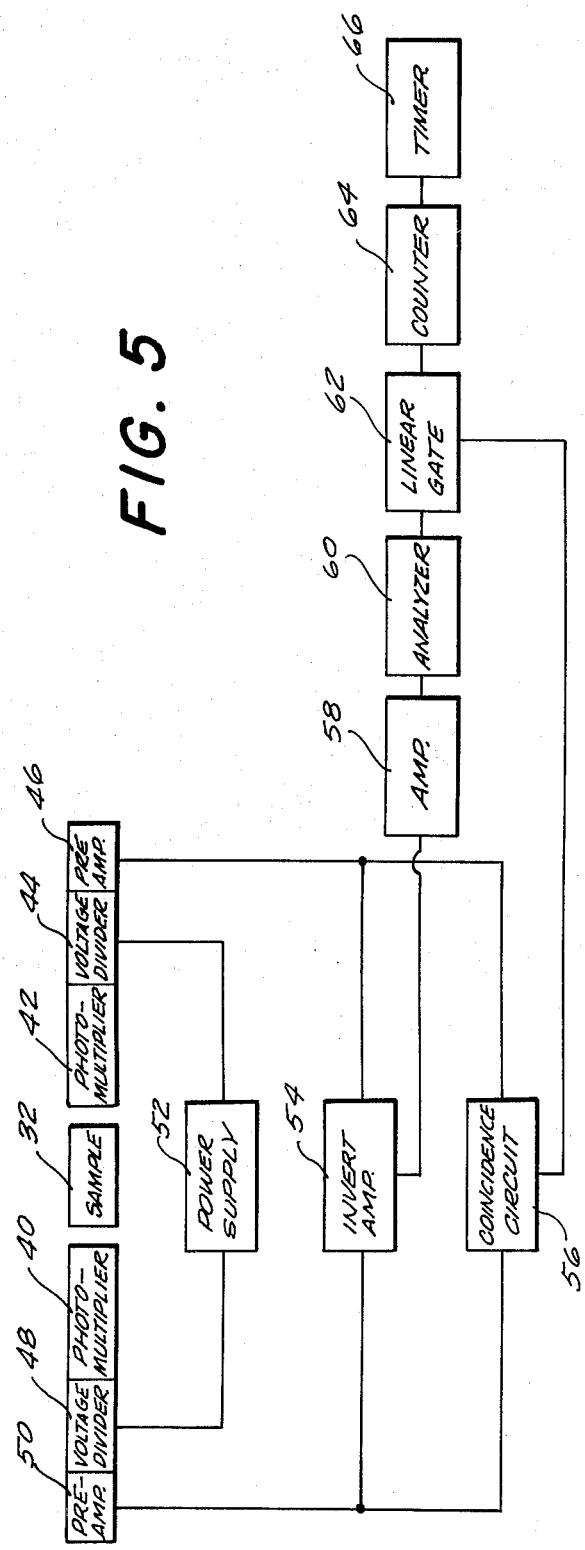
FIG. 5 is a block diagram of the electronic circuitry which may be utilized in conjunction with the analyzer of the present invention.

FIG. 5 shows schematically a sample 32 placed between a pair of photomultiplier tubes 40, 42 which may be RCA 8575 of the like. Photomultiplier tube 42 is connected to a voltage divider network 44 which in turn is connected to a preamplifier 46. In a similar manner, photomultiplier tube 40 is connected to a voltage divider network 48 which in turn is connected to a preamplifier 50. A high voltage power supply 52 is connected to voltage divider networks 44 and 48 respectively to provide the high voltage potential for each photomultiplier tube.

Preamplifiers 46 and 50 are connected to a dual sum and invert amplifier 54 as well as a coincidence circuit 56. The output of dual sum and invert amplifier 54 is transferred to amplifier 58 which in turn is connected to a single channel analyzer 60 which provides the basic count. The output of analyzer 60 is transferred to a linear gate 62 which also receives the output of coincidence circuit 56. Coincidence circuit 56 controls linear gate 62 such that only signals generated by both phototubes simultaneously are counted in counter 64 which is connected to the output of linear gate 62. This system assures that only real particle emissions are counted and eliminates most of the background. Counter 64 is connected to a timer control 66 which serves to accurately control the amount of time for which the counting takes place.

It should be emphasized that the element analyzer of the present invention is best suited for operation when coupled to an element separation system. Ion exchange chromatography, chemical and radiochemical separation methods of extreme sophistication are available and may be used successfully in this regard.

Figure 6:
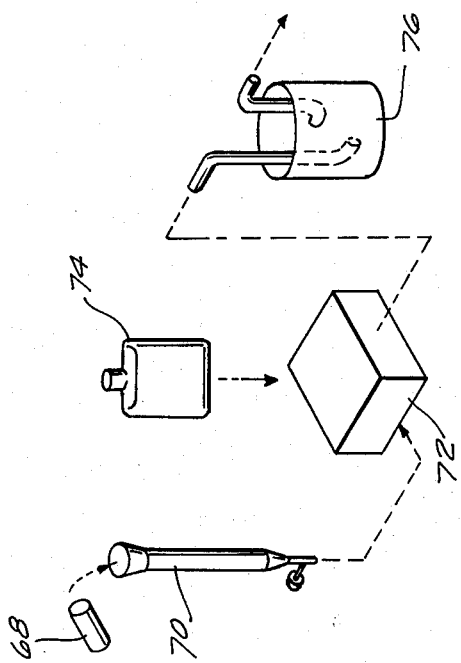
FIG. 6 is a schematic diagram of an element separation system which can be used in conjunction with the present invention to automate same.

FIG. 6 shows a schematic representation of how the element analyzer of the present invention can be utilized in conjunction with an element separation system. The specimen contained in a vial 68 is poured into an ion exchange chromatography column 70 wherein it is absorbed. By varying the pH of a liquid which is introduced into the ion exchange column, the different elements in the specimen are continuously separated. The liquid is then transferred to a dilution pump 72 wherein distilled water 74 is added. The solution is pumped through a flowthrough cell 76 which is located within the element analyzer of the present invention, and which in effect is the same as the vial 32 of FIG. 1 or FIG. 3. In this manner, the analyzer is continuously operative, the resolution of the element analyzer is significantly enhanced and the analyzer's inherent advantages of speed and efficient sample handling are utilized more fully.

A complete sample analysis could be done of a water solution within minutes using an ion exchange column, flowthrough cell and dilution device with constant irradiation with a low gamma neutron source. Alternatively, irradiation of separate samples with a high intensity spontaneous fission source followed by counting could be done. A third method might be the alternating of irradiation with a neutron source with short counts. However, this latter method of intermittent radiation and counting might require special light shutter devices in front of the detectors.

Thus, the design of the element analyzer of the present invention is readily adaptable for automatic sample handling and counting, yielding sensitive and accurate results without the necessity for high neutron fluxes only available through the use of a nuclear reactor. Such is ordinarily not possible with prior art devices because of the higher neutron fluxes required precluding the use of a small irradiating and counting assembly. Use of advanced neutron sources such as $Cf^{252}$ (high gamma background) spontaneous fission neutron sources can increase the sensitivity of the element analyzer due to the availability of higher neutron fluxes from these sources. Such sources would have to be replaced every few years depending upon the initial activity.

Because of the possibility of simultaneous neutron activation and counting, the present invention is sensitive to certain particle emissions, such as those involving short half-life isotopes, which prior art methods were unable to detect. This technique allows for the neutron activation analysis of specie previously not analyzable due to their extremely short half lives. Low gamma background neutron sources are commonly available for such applications.

Further, the present invention is not only element specific it is also sensitive to different isotopes of the same element thereby making it useful for certain special types of nuclear work. Moreover, it is versatile in that it can be used as a scintillation counter, if desired. However, this may require minor modifications.

The speed and sensitivity of the element analyzer of the present invention in many applications would depend upon the speed of the element separation methods used in conjunction therewith. An analysis of a sample of four or five elements can often be done in fifteen minutes when an ion exchange chromatography separation system is used in conjunction with the analyzer. In most cases, the sensitivity is dependent upon the neutron cross-section of the specimen only.

Finally, the cost of the element analyzer of the present invention is comparable to commercially available atomic absorption units. The element analyzer is designed for use without a nuclear reactor. The element analyzer can be used successfully with electronic components of relatively simple nature, if an element separation system is used and element discrimination is required only in special cases. Thus, the element analyzer of the present invention is extremely well suited to applications where minimum sample preparation and expense are key factors and where quantitative and qualitative nondestructive analysis of trace elements is required.

While but a limited number of embodiments of the present invention have been herein specifically described, it would be apparent that many variations and modifications may be made therein. It is intended to cover all of these variations and modifications which fall within the scope of the instant invention as defined by the following claims.

I claim:

1. Apparatus for the analysis of a specimen wherein a sample is prepared from the specimen and a dielectric medium, said apparatus comprising a base having a portion defining a substantially eliptical cavity therein, means for placing the sample in said cavity, a neutron source positioned to irradiate the sample to emit particles, detector means for detecting photons emitted during the passage of these particles through the medium and for generating a signal in accordance with the occurrence thereof and means operably connected to said detector means for processing said signals.

2. The apparatus of claim 1 wherein the inner surface of said cavity is coated with a light reflective material.

3. The apparatus of claim 1 wherein said portion defines a cavity having a substantially double elliptical shape.

4. The apparatus of claim 3 wherein said detector means comprises a photomultiplier tube, said tube being located such that said cavity is interposed between said tube and said sample.

5. The apparatus of claim 3 wherein the inner surface of said cavity is coated with a light reflective material.

6. The apparatus of claim 5 wherein said material comprises a metal having a relatively small neutron capture cross-section.

7. The apparatus of claim 6 wherein said material is selected from a group consisting of beryllium, aluminum and the oxides thereof.

8. The apparatus of claim 6 wherein said material does not emit particles yielding a light pulse.

9. The apparatus of claim 6 wherein said material's neutron activation specie have a very long half life.

10. The apparatus of claim 1 wherein said cavity comprises two portions located one on each side of the sample.

11. The apparatus of claim 10 wherein each of said cavity portions is elliptical.

12. The apparatus of claim 11 wherein each of said portions is coated with a light reflective material.

13. The apparatus of claim 11 comprising separate detector means for each portion.

14. The apparatus of claim 13 wherein each of said portions is coated with a light reflective material.

15. The apparatus of claim 10 comprising separate detector means for each portion.

16. The apparatus of claim 15 wherein each of said portions is coated with a light reflective material.

17. The apparatus of claim 15 wherein said signal processing means comprises a coincidence circuit.

18. The apparatus of claim 17 wherein said processing means further comprises means for counting the number of signals from said detecting means.

19. The apparatus of claim 10 wherein each of said portions is coated with a light reflective material.

20. The apparatus of claim 10 wherein each of said cavity portions has elliptically shaped inner surfaces.

21. The apparatus of claim 20 comprising separate detector means for each portion.

22. The apparatus of claim 20 wherein each of said portions is coated with a light reflective material.

23. Apparatus for analysis of a specimen wherein a sample is formed of the specimen and a dielectric medium, said apparatus comprising a base having a portion defining a substantially eliptical cavity therein, means for continuously flowing said sample through said cavity, a neutron source positioned to irradiate the sample within said cavity to emit particles, detector means for detecting the presence of a particle and for generating a signal in accordance with the occurrence thereof and means operably connected to said detector means for processing said signals.

24. The apparatus of claim 23 wherein said continuous flow means comprises an element separation system.

25. The apparatus of claim 24 wherein said separation system comprises an ion exchange column.

26. The apparatus of claim 25 wherein the inner surface of said cavity is coated with a light reflective material.

27. The apparatus of claim 26 wherein said material does not emit particles yielding a light pulse.

28. The apparatus of claim 26 wherein said material's neutron activation specie have a very long half life.

29. The apparatus of claim 26 wherein said material comprises a metal having a relatively small neutron capture cross-section.

30. The apparatus of claim 29 wherein said material is selected from a group consisting of beryllium, aluminum and the oxides thereof.

31. The apparatus of claim 30 wherein said detector means comprises a photomultiplier tube, said tube being located such that said cavity is interposed between said tube and said sample.

32. The apparatus of claim 24 wherein said portion defines a substantially double elliptical shaped cavity.

33. The apparatus of claim 24 wherein the inner surface of said cavity is coated with a light reflective material.

34. The apparatus of claim 24 wherein said cavity comprises two portions located one on each side of the sample.

35. The apparatus of claim 34 comprising separate detector means for each portion.

36. The apparatus of claim 35 wherein each of said portions is coated with a light reflective material.

37. The apparatus of claim 35 wherein said signal processing means comprises a coincidence circuit.

38. The apparatus of claim 37 wherein said processing means further comprises means for counting the number of signals from said detecting means.

* * * * *